US012305803B1

(12) United States Patent
Lin (10) Patent No.: US 12,305,803 B1
(45) Date of Patent: May 20, 2025

(54) AI-DRIVEN WIRELESS LUBRICATOR REMOTE CONTROL SYSTEM

(71) Applicant: HORNCHE CORPORATION, Taoyuan (TW)

(72) Inventor: Shih-Kuei Lin, Taoyuan (TW)

(73) Assignee: HORNCHE CORPORATION, Taoyuan (TW)

( * ) Notice: Subject to any disclaimer, the term of this patent is extended or adjusted under 35 U.S.C. 154(b) by 0 days.

(21) Appl. No.: 18/625,192

(22) Filed: Apr. 2, 2024

(51) Int. Cl.
*F16H 57/04* (2010.01)
*F16N 25/00* (2006.01)

(52) U.S. Cl.
CPC .......... *F16N 25/00* (2013.01); *F16N 2230/00* (2013.01); *F16N 2250/08* (2013.01); *F16N 2270/20* (2013.01)

(58) Field of Classification Search
CPC .......... F16N 29/02; F16N 29/00; F16N 25/00; F16N 2230/00
See application file for complete search history.

(56) References Cited

U.S. PATENT DOCUMENTS

| | | | | |
|---|---|---|---|---|
| 6,101,427 A * | 8/2000 | Yang | ...................... | F16N 29/02 700/239 |
| 6,189,656 B1 * | 2/2001 | Morgenstern | ........... | F16N 17/06 184/7.4 |
| 9,695,979 B2 * | 7/2017 | Conley | ............... | F16C 33/6625 |
| 2004/0197040 A1 * | 10/2004 | Walker | .................. | F16C 41/008 384/624 |
| 2011/0253481 A1 * | 10/2011 | Lin | ......................... | F16N 11/08 184/108 |
| 2013/0015019 A1 * | 1/2013 | Kuvaja | .................. | F16N 29/02 184/26 |
| 2013/0197738 A1 * | 8/2013 | Dvorak | .............. | G01N 33/2858 701/29.5 |
| 2019/0040998 A1 * | 2/2019 | Wride | ...................... | F16N 29/04 |
| 2019/0263341 A1 * | 8/2019 | Gustafson | ............... | F16N 29/02 |
| 2020/0347990 A1 * | 11/2020 | McKim | ................... | F16N 25/00 |
| 2020/0357221 A1 * | 11/2020 | Amar | ...................... | F16N 11/00 |
| 2021/0018001 A1 * | 1/2021 | Stewart | ................... | F16N 29/00 |
| 2021/0215204 A1 * | 7/2021 | Na | ........................ | F16C 37/002 |
| 2021/0310612 A1 * | 10/2021 | Kreutzkaemper | ........ | F16N 7/00 |
| 2022/0127980 A1 * | 4/2022 | Talen | .................... | B05B 12/085 |
| 2022/0196141 A1 * | 6/2022 | Bishop | ................. | G01N 29/032 |

(Continued)

*Primary Examiner* — Michael A Riegelman (57) ABSTRACT

An AI-driven wireless lubricator remote control system includes multiple grease injection lubrication devices, a cloud server host and an artificial intelligence (AI) system. Each grease injection lubrication device includes a central control processing unit, a grease injection lubrication unit, a parameter setting unit, an operating status information unit, a detection unit, a warning unit, a wireless communication unit and a remaining oil volume information unit. The grease injection lubrication device can independently monitor the oil supply status and abnormal operating status information of individual lubrication points, and through wireless remote transmission (network or satellite network), the grease injection lubrication device information distributed on the mechanical equipment scattered around the factory is sent to the cloud server host. Furthermore, the mobile device can view the information of each grease injection lubrication device and issue commands directly through APP and the Internet (connected to the cloud server host).

10 Claims, 6 Drawing Sheets

(56) References Cited

U.S. PATENT DOCUMENTS

| | | | |
|---|---|---|---|
| 2022/0412912 A1* | 12/2022 | Zambon | F01M 11/10 |
| 2023/0123102 A1* | 4/2023 | Keinan | F16N 29/00 |
| | | | 184/7.4 |
| 2023/0204156 A1* | 6/2023 | Zhang | F16N 29/00 |
| | | | 702/1 |
| 2024/0003783 A1* | 1/2024 | Lundberg | F16N 25/00 |
| 2024/0301996 A1* | 9/2024 | Graf | F16N 7/14 |

* cited by examiner

AI-DRIVEN WIRELESS LUBRICATOR REMOTE CONTROL SYSTEM

BACKGROUND OF THE INVENTION

1. Field of the Invention

The invention relates lubricator technology, in particular, an AI-driven wireless lubricator remote control system that has artificial intelligence (AI) training and learning functions.

2. Description of the Related Art

Traditionally used in industrial lubrication points that require maintenance of mechanical equipment, manual grease guns (commonly known as grease guns) or electric or pneumatic grease machines are used to perform lubrication maintenance and routine maintenance inspections at individual single points. Although the grease capacity of the bearing at the lubrication point can be calculated, the traditional grease injection method has many shortcomings. Since there are many lubrication points for mechanical equipment in the industry that require maintenance, individual operating conditions and needs are significantly different. In addition to the fact that the grease injection time cannot be accurately controlled and executed, it is impossible to control the amount of oil (grease injection amount) to meet the amount of grease required by the bearing, and it is impossible to estimate when it will need to be replenished (i.e. the correct maintenance interval), and it only depends on the maintainer's best efforts based on past experience. Therefore, it is common that the amount of grease injected is too saturated, causing damage to the shaft seal and serious grease leakage (especially visible to the naked eye for open bearings). For closed bearings (such as motor bearings), no one knows whether the amount of grease injected is excessive or insufficient?

Excessive grease injection may easily cause damage to the shaft seal, resulting in bearing saturation, poor heat dissipation, and easy burning. When the grease is insufficient or replenished over time, the lubricating oil film will not be enough to maintain the lubrication quality, and it will not be possible to re-lubricate at the required intervals in a timely manner. These conditions are usually important factors that cause bearing damage or shortened service life, which not only consumes resources and manpower, but even causes downtime and affects production. Although there are currently some grease injector creations on the market, such as: spring feed grease cups, automatic grease cups, pneumatic grease injectors, etc. However, it is known that the above-mentioned grease injectors still have problems such as poor grease delivery and difficulty in control. It is also impossible to know whether the grease injector has become abnormal or malfunctioned, and has stopped operating without knowing. Therefore, temporary damage to mechanical equipment for no reason still often occurs, so its applicability still needs to be improved.

SUMMARY OF THE INVENTION

The invention provides an AI-driven wireless lubricator remote control system. The AI-driven wireless lubricator remote control system comprises a plurality of grease injection lubrication devices, a cloud server host, an artificial intelligence (AI) system and a mobile device. Each grease injection lubrication device comprises a central control processing unit, a grease injection lubrication unit, a parameter setting unit, an operating status information unit, a detection unit, a warning unit, a wireless communication unit and a remaining oil volume information unit. The grease injection lubrication unit is connected to the central control processing unit. The grease injection lubrication unit is used to output a lubricant. The parameter setting unit is connected to the central control processing unit. The parameter setting unit is used to set grease injection parameters. The operating status information unit is connected to the central control processing unit. The operating status information unit is used to store various operating status information. The detection unit is provided with a plurality of sensors with different types of functions. The detection unit is connected to the central control processing unit and used to detect the operating status information and the remaining oil volume information of the grease injection lubrication devices and regularly transmit the operating status information and the remaining oil volume information of the grease injection lubrication devices back to the central control processing unit. The warning unit is connected to the central control processing unit. The warning unit has at least one preset warning value and is used to issue a corresponding warning notification if it is determined that any one of the at least one preset warning value is exceeded. The wireless communication unit is connected to the central control processing unit. The grease injection lubrication device is connected to a network through the wireless communication unit to receive or transmit instructions or information. The remaining oil volume information unit is connected to the central control processing unit and is used to record the remaining oil volume information. The cloud server host is connected to the wireless communication units of the grease injection lubrication devices through the network. The cloud server host independently calculates a corresponding lubrication maintenance specification based on a bearing specification of an application equipment and application environmental condition information. The parameter setting unit performs a grease injection parameter setting according to the lubrication maintenance specification, wherein different types of application equipment have different lubrication maintenance specifications. The artificial intelligence (AI) system is connected to the cloud server host through the network. The artificial intelligence (AI) system is used to regularly receive various data of the application equipment through the grease injection lubrication devices to adjust the grease injection parameter settings recommended by the lubrication maintenance specification in the cloud server host and continue to detect and obtain various data of the application equipment after setting the new grease injection parameter settings on the grease injection lubrication devices, and use this cycle of training, learning and adjustment to achieve optimal settings, so that the cycle of training, learning and adjustment is used to achieve optimal settings, wherein each grease injection lubrication device regularly reports the operating status information, the remaining oil volume information and the warning notification to the cloud server host.

In one embodiment of the present invention, a mobile device is used to connect to the cloud server host through the network, so that the mobile device can receive information from the cloud server host through an application (APP) to master the operating status information, the remaining oil volume information and the warning notification of the grease injection lubrication devices.

In one embodiment of the present invention, based on a deep learning algorithm, the artificial intelligence (AI) system regularly receives the post-lubrication temperature of the application equipment through the grease injection lubrication devices, adjusts the grease injection parameter settings recommended by the lubrication maintenance specification corresponding to the data of temperature, rotation speed and bearing type in the cloud server host according to the temperature after lubrication, and sets the new grease injection parameter settings to the grease injection lubrication devices, and then continuously detects the post-lubrication temperature of the application equipment to cycle training, learning and adjustment.

In one embodiment of the present invention, the artificial intelligence (AI) system comprises a database unit, a learning and training unit, a condition restriction unit, and an AI model processing unit. The database unit is connected to the cloud server host through the network to update relevant data online, including the data of the application equipment regularly reported by the grease injection lubrication devices and the deep learning algorithm. The learning and training unit is connected to the database unit, and performs learning and training through the deep learning algorithm and based on the relevant data in the database unit. The condition restriction unit is connected to the learning and training unit, and is used to limit the learning bias of the artificial intelligence (AI) system by setting multiple conditions. The AI model processing unit is connected to the learning and training unit. The AI model processing unit learns and trains an AI model through the learning and training unit. The AI model processing unit is the AI brain of the artificial intelligence (AI) system.

In one embodiment of the present invention, the mobile device is also used to send commands to the cloud server host to further control the operation of each grease injection lubrication device.

In one embodiment of the present invention, when each grease injection lubrication device regularly reports the remaining oil volume information to the cloud server host, the cloud server host calculates an oil exhaustion date for each grease injection lubrication device based on the remaining oil volume information and a grease injection frequency setting value.

In one embodiment of the present invention, the cloud server host sends a consumable replacement notification reminder in advance and at least once based on the oil exhaustion date.

In one embodiment of the present invention, when the detection unit detects a system connection failure, grease injection abnormality, mechanical failure or abnormal event that stops operation, the warning unit immediately issues a warning notification corresponding to the abnormal event.

In one embodiment of the present invention, each grease injection lubrication device further comprises a satellite network communication unit connected to the central control processing unit, and each grease injection lubrication device is connected to a satellite Internet composed of multiple satellites through the satellite network communication unit thereof to receive or transmit instructions or information.

In one embodiment of the present invention, the network can be the Internet or a private network.

It will be easier to understand the purpose, technical content, characteristics and effects of the present invention through detailed description below through specific embodiments.

DETAILED DESCRIPTION OF THE INVENTION

After years of research and development, the inventor has improved the criticisms of existing products. Subsequently, we will introduce in detail how this invention uses an AI-driven wireless lubricator remote control system to achieve the most efficient functional requirements.

Figure 1:
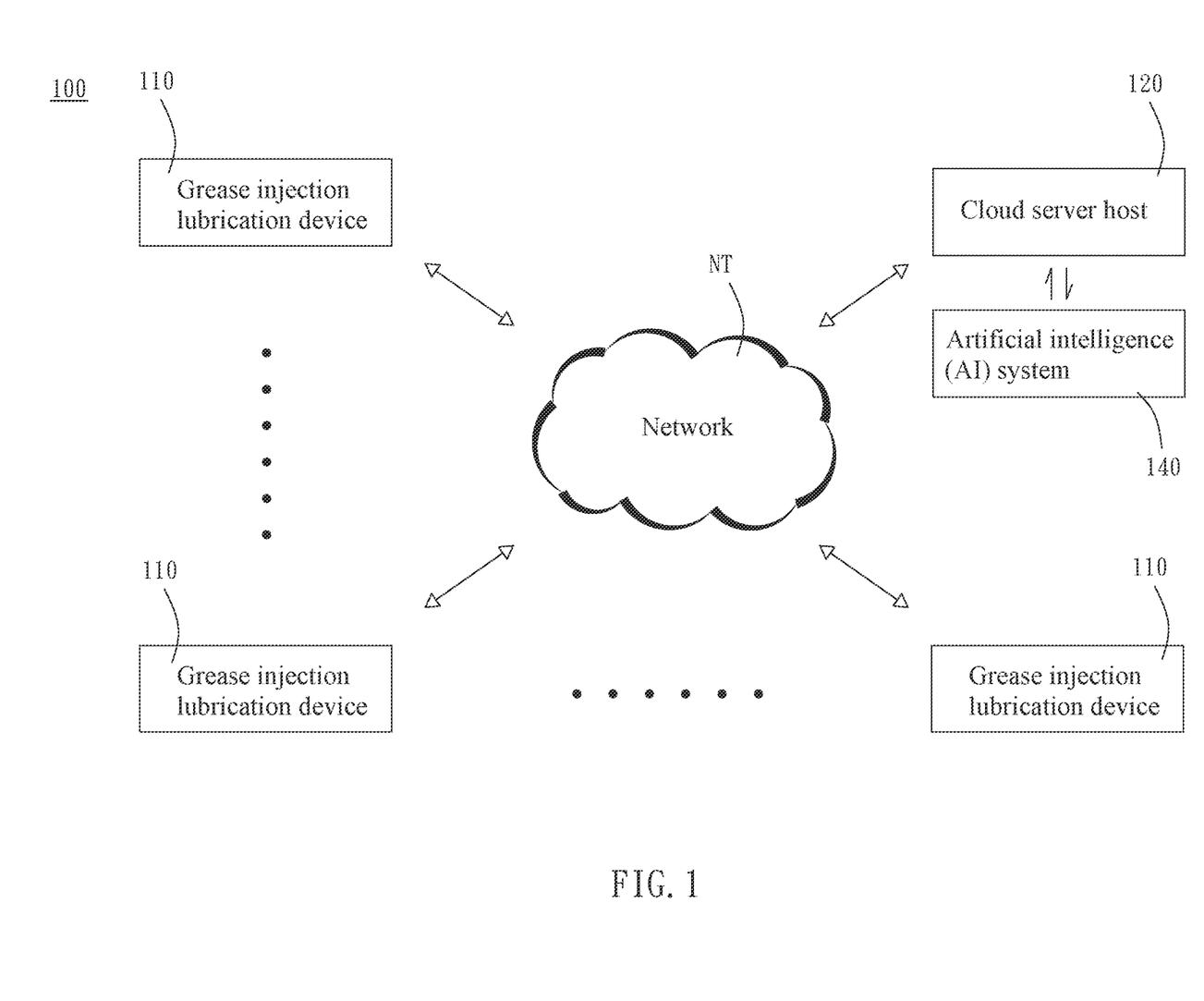
FIG. 1 is a schematic diagram of the architecture of the AI-driven wireless lubricator remote control system of the present invention.
Figure 2:
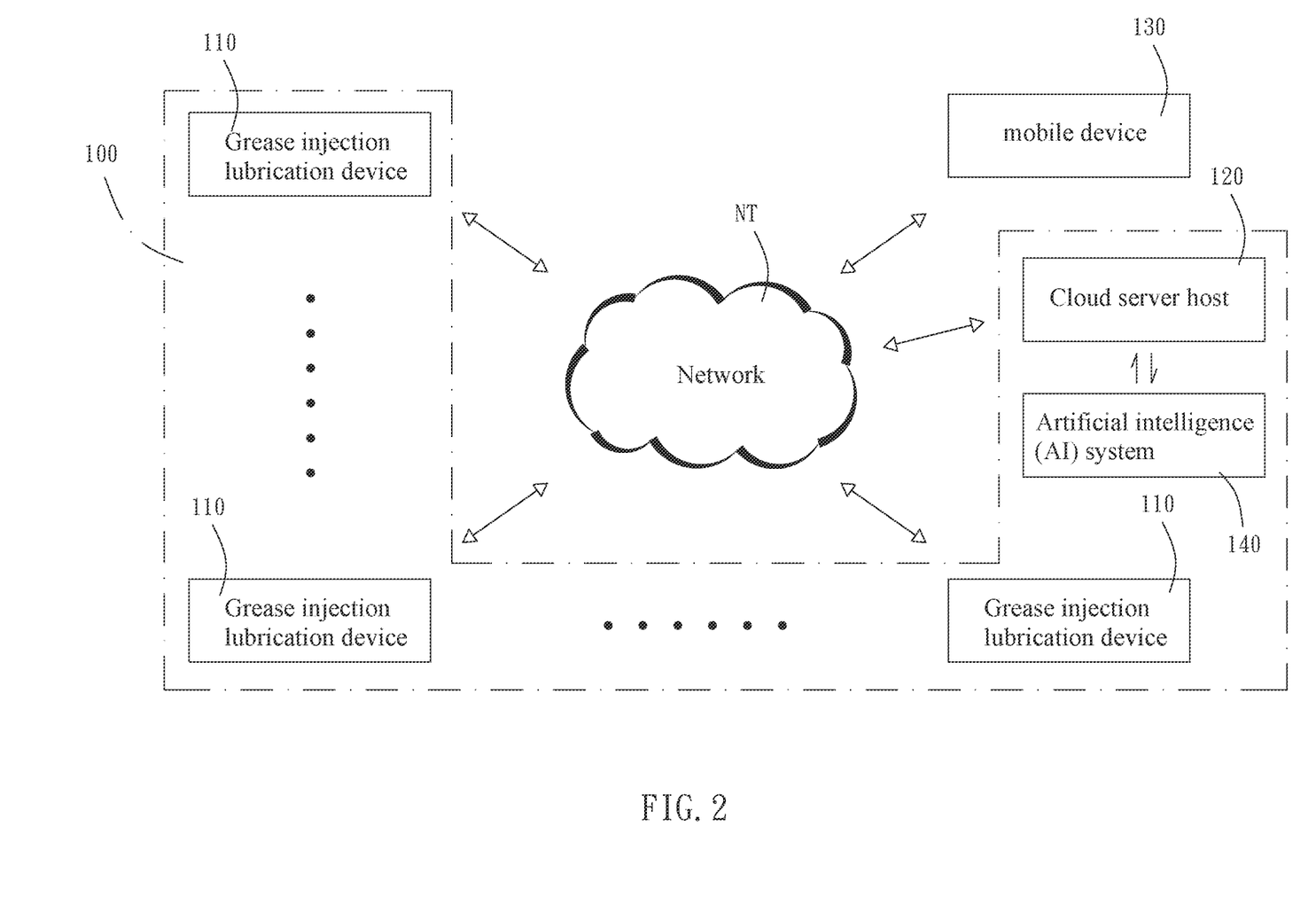
FIG. 2 is another schematic diagram of the AI-driven wireless lubricator remote control system of the present invention.
Figure 3:
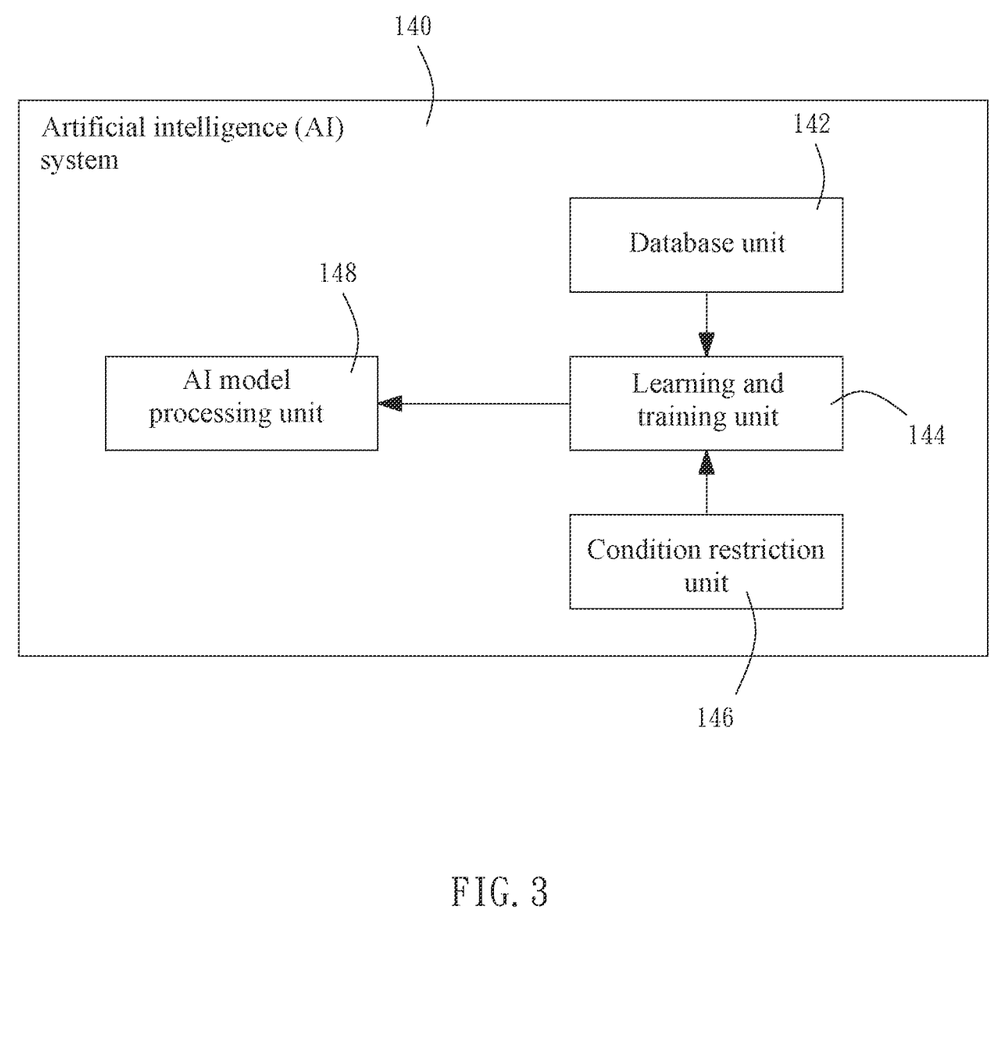
FIG. 3 is a system block diagram of the artificial intelligence (AI) system of the present invention.
Figure 4:
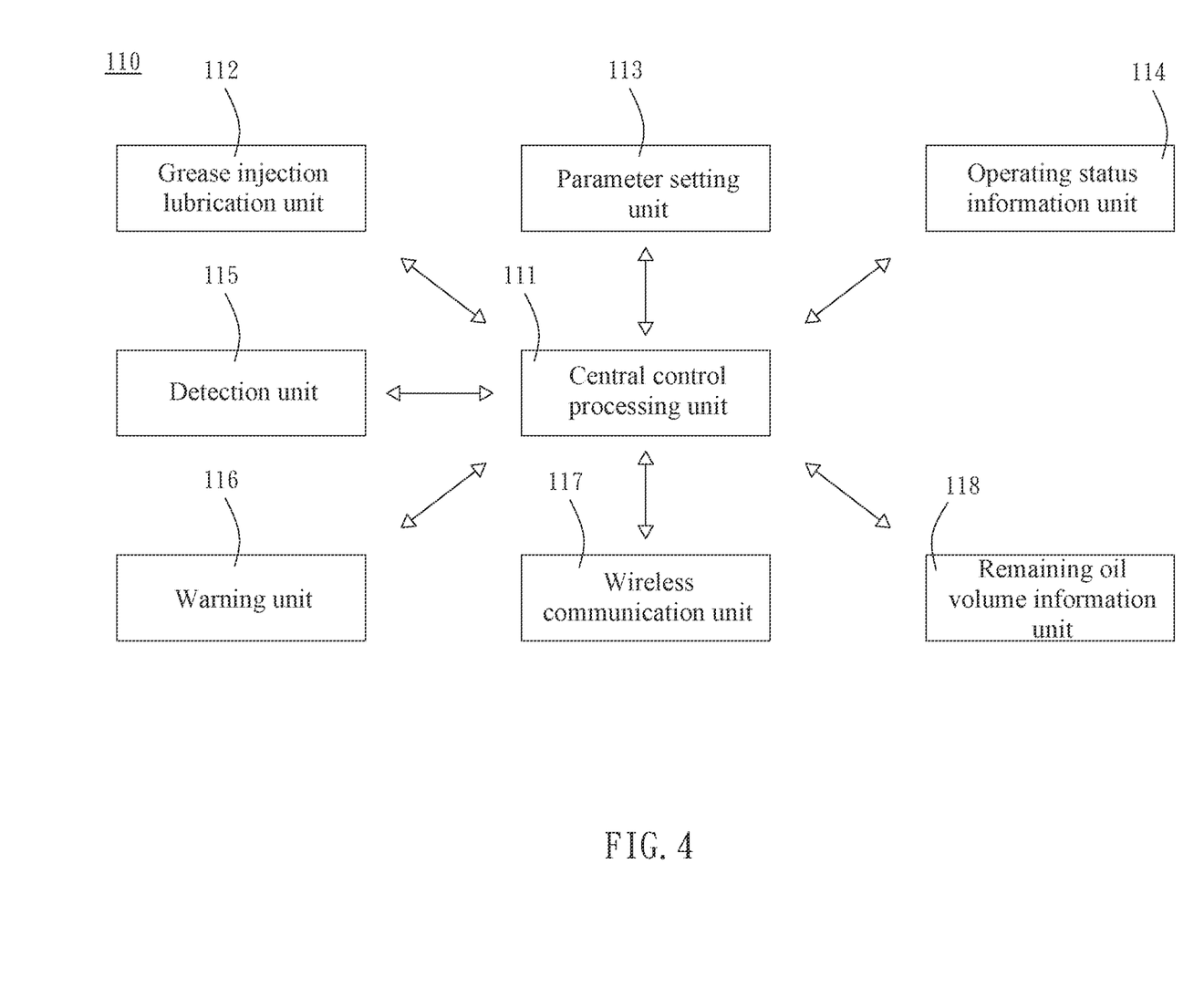
FIG. 4 is a schematic diagram of the grease injection lubrication device of the AI-driven wireless lubricator remote control system of the present invention.

Please refer to FIGS. 1-4, where. FIG. 1 is a schematic diagram of the architecture of the AI-driven wireless lubricator remote control system of the present invention, FIG. 2 is another schematic diagram of the AI-driven wireless lubricator remote control system of the present invention, FIG. 3 is a system block diagram of the artificial intelligence (AI) system of the present invention, and FIG. 4 is a schematic diagram of the grease injection lubrication device of the AI-driven wireless lubricator remote control system of the present invention. As shown in the figures, the AI-driven wireless lubricator remote control system 100 of the present invention can be used in industry for mechanical equipment that requires daily grease lubrication and routine inspection and maintenance work. The specially developed and designed AI-driven wireless lubricator remote control system 100 can independently monitor the oil supply status and abnormal operating status information of individual lubrication points, and transmit the information of grease injection lubrication devices 110 scattered on the mechanical equipment around the factory to a cloud server host 120 through wireless long-distance transmission (Internet, private network or satellite network). Furthermore, the mobile device can view the information of each grease injection lubrication device 110 and issue commands directly through the APP and the Internet (connected to the cloud server host 120). If any grease injection lubrication device 110 has a system connection failure, grease injection abnormality, malfunction, or stops operating, the cloud server host 120 can simultaneously send out an alarm and display the installation location and information of the abnormal grease injection lubrication device 110. This allows maintenance personnel to go immediately to deal with the problem, restore normal grease injection, and improve the comprehensive protection function of automatic early warning and monitoring of grease injection.

Furthermore, the AI-driven wireless lubricator remote control system 100 of the present invention comprises a plurality of grease injection lubrication devices 110, a cloud server host 120 and an artificial intelligence (AI) system 140. Each of the plurality of grease injection lubrication devices 110 comprises a central control processing unit 111, a grease injection lubrication unit 112, a parameter setting unit 113, an operating status information unit 114, a detection unit 115, a warning unit 116, a wireless communication unit 117 and a remaining oil volume information unit 118. The grease injection lubrication unit 112 is connected to the central control processing unit 111. The grease injection lubrication unit 112 is used to output a lubricant to a lubrication point of the machine. The parameter setting unit 113 is connected to the central control processing unit 111, and the parameter setting unit 113 is used to set the grease injection parameters. The operating status information unit 114 is connected to the central control processing unit 111, and the operating status information unit 114 is used to store various operating status information. The detection unit 115 is connected to the central control processing unit 111, and the detection unit 115 is used to detect the operating status information of the grease injection lubrication device 110 (such as system connection failure, grease injection abnormality, malfunction, or cessation of operation) and a remaining oil volume information, and regularly feedback the detected information to the central control processing unit 111. The detection unit 115 has sensors with different types of functions. The warning unit 116 is connected to the central control processing unit 111. The warning unit 116 has at least one preset warning value, and if it is determined that the preset warning value is exceeded, a corresponding warning notification will be issued. It should be noted that when the detection unit 115 detects a system connection failure, abnormal grease injection, mechanical failure or abnormal event that stops operation, the warning unit 116 will issue a warning notification corresponding to the abnormal event. The wireless communication unit 117 is connected to the central control processing unit 111. The grease injection lubrication devices 110 are connected to the network NT through the respective wireless communication units 117 to receive or transmit instructions or information. The network NT can be the Internet or a private network. The remaining oil volume information unit 118 is connected to the central control processing unit 111, and the remaining oil volume information unit 118 is used to record the remaining oil volume information.

In addition, the cloud server host 120 is connected to the wireless communication units 117 of the grease injection lubrication devices 110 through the network NT, and the cloud server host 120 independently calculates a corresponding lubrication maintenance specification based on the specifications of a bearing of an application equipment and application environmental condition information. When the grease injection lubrication devices 110 are registered with the cloud server host 120, the cloud server host 120 will send the corresponding lubrication maintenance specifications to the grease injection lubrication devices 110. The central control processing unit 111 of each grease injection lubrication device 110 will instruct the respective parameter setting unit 113 to perform a grease injection parameter setting according to the lubrication maintenance specification. Different types of bearings have different lubrication and maintenance specifications. It is worth noting that the artificial intelligence (AI) system 140 is connected to the cloud server host 120 through the network NT. The artificial intelligence (AI) system 140 is used to regularly receive various data of at least one application equipment through the grease injection lubrication devices 110 to adjust the grease injection parameter settings recommended by the lubrication maintenance specifications in the cloud server host 120. After the new grease injection parameter settings are set to the grease injection lubrication devices 110, various data of the application equipment are continuously detected and used to cycle training, learning and adjustment to achieve optimal settings. That is to say, based on a deep learning algorithm, the artificial intelligence (AI) system regularly receives the post-lubrication temperature of the application equipment through the grease injection lubrication devices 110 according to the temperature after lubrication, adjusts the grease injection parameter settings recommended by the lubrication maintenance specification corresponding to the data of temperature, rotation speed and bearing type in the cloud server host 120, and continuously detects the post-lubrication temperature of the application equipment after the new grease injection parameter settings are set to the grease injection lubrication devices 110. This is a cycle of training, learning and adjustment (detection and transmission of data to the cloud server host 120 through the detection unit 115 and the central control processing unit 111, the artificial intelligence (AI) system 140 then reads data from the cloud server host 120 and analyzes it).

Furthermore, the artificial intelligence (AI) system 140 comprises a database unit 142, a learning and training unit 144, a condition restriction unit 146 and an AI model processing unit 148. The database unit 142 connects to the cloud server host 120 through the network NT to update relevant data online, including data of the application equipment regularly reported by the grease injection lubrication devices 110 and the deep learning algorithm. The learning and training unit 144 is connected to the database unit 142. The learning and training unit 144 performs learning and training through the deep learning algorithm and based on the relevant data in the database unit 142. The condition restriction unit 146 is connected to the learning and training unit 144. The condition restriction unit 146 is used to limit the learning bias of the artificial intelligence (AI) system 140 by setting multiple conditions. The AI model processing unit 148 is connected to the learning and training unit 144, and the AI model processing unit 148 learns and trains an AI model through the learning and training unit 144. The AI model processing unit 148 is the AI brain of the artificial intelligence (AI) system 140. In this embodiment, the AI model processing unit 148 can also be directly connected to the cloud server host 120 through the network NT, but it is not limited to this embodiment.

It should be noted that the user or administrator can understand the relevant data and status through the mobile device 130, that is, the mobile device 130 can connect to the cloud server host 120 through the network NT. The mobile device 130 is used to receive information from the cloud server host 120 through an application program (APP) to master all operating status information of each grease injection lubrication device 110, the remaining fuel information and the warning notification (if any). In addition, instructions can be sent to the cloud server host 120 through the mobile device 130 to further control the operation of each grease injection lubrication device 110, such as starting or stopping grease injection, adjusting the frequency of grease injection, adjusting the reporting period, etc. Its designers can further plan the functions that need to be adjusted or controlled according to the actual situation. Through the above, the control device can be accurately used to set different cycle times and intermittently control the driving device to achieve regular and quantitative automatic grease injection, supplying fresh grease to the machine parts for lubrication and maintenance.

Furthermore, each grease injection lubrication device 110 will regularly report its own operating status information, the remaining oil volume information and the warning notification to the cloud server host 120, so that the cloud server host 120 can grasp the status of each grease injection lubrication device 110 at all times and throughout the entire process. For example, the cloud server host 120 can record bearing lubrication amount, calculation of grease injection rate (interval time period), data creation of equipment lubrication points, set lubrication period of grease injector, abnormal warning and inspection, maintenance records. It has complete system functions such as archiving, recording, storage and management inquiry of historical data of the lubrication equipment and the grease injectors. It is worth mentioning that each grease injection lubrication device 110 will regularly report the remaining oil volume information to the cloud server host 120, and the cloud server host 120 will calculate an oil exhaustion date for each grease injection lubrication device based on the remaining oil volume information and a grease injection frequency setting value. Afterwards, the cloud server host 120 will send out at least one consumable replacement notification reminder in advance based on the oil exhaustion date, and let the operator know whether the factory's grease stock is sufficient. In addition, the AI-driven wireless lubricator remote control system 100 of the present invention can be further expanded to multiple factories. The multiple grease injection lubrication devices 110 within each factory can be considered regional group devices. The multiple grease injection lubrication devices 110 in each factory can be connected to the cloud server host 120, so that the cloud server host can monitor multiple grease injection lubrication devices 110 in different factories at the same time, and can also know in advance whether the oil volume of each grease injection lubrication device 110 is about to be exhausted.

It is worth noting that the AI-driven wireless lubricator remote control system 100 of the present invention has an AI learning function. That is, based on a deep learning algorithm, the artificial intelligence (AI) system 140 will regularly receive the post-lubrication temperature of the application equipment through the grease injection lubrication devices 110, and adjust the grease injection parameter setting recommended by the lubrication maintenance specification corresponding to the data of temperature, rotation speed and bearing type in the cloud server host according to the temperature after lubrication. After setting the new grease injection parameter settings to the grease injection lubrication devices 110, the post-lubrication temperature of the application equipment is continuously detected to cycle training, learning and adjustment.

Figure 5:
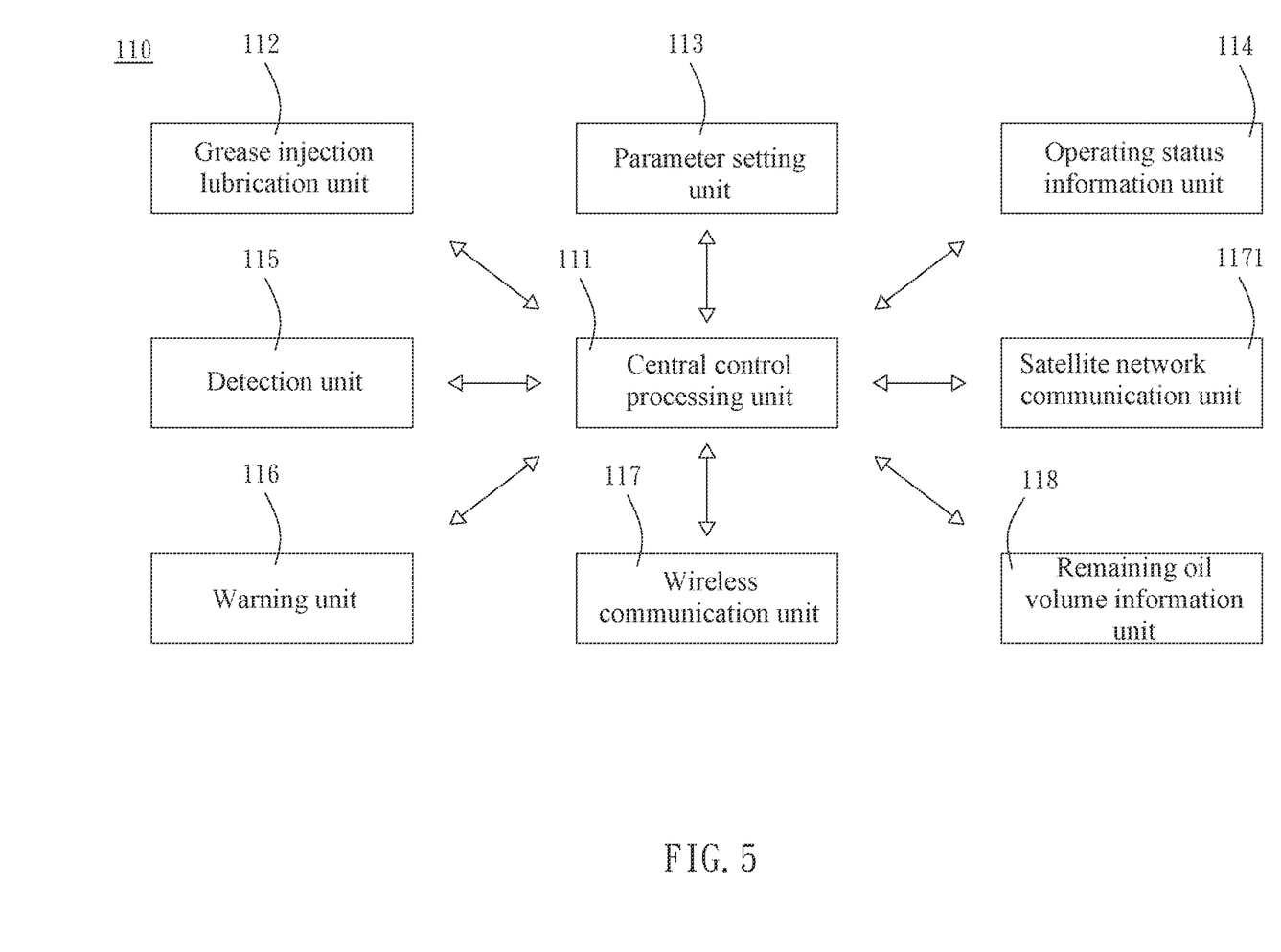
FIG. 5 is another schematic diagram of the grease injection lubrication device of the AI-driven wireless lubricator remote control system of the present invention.
Figure 6:
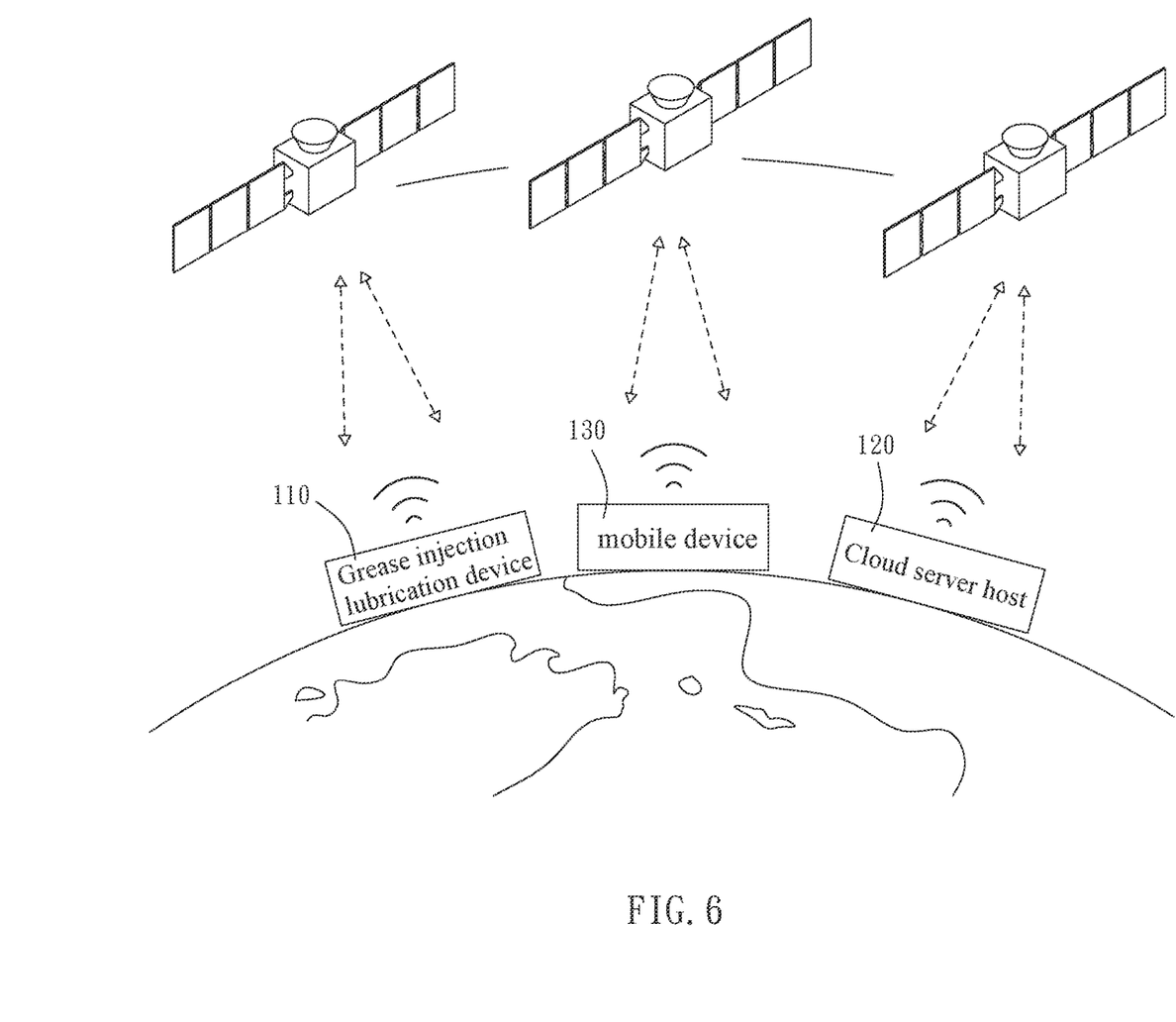
FIG. 6 is a schematic diagram of the AI-driven wireless lubricator remote control system of the present invention operating through a satellite communication network.

Next, please refer to FIG. 1, FIG. 5 and FIG. 6, where FIG. 5 is another schematic diagram of the grease injection lubrication device of the AI-driven wireless lubricator remote control system of the present invention, and FIG. 6 is a schematic diagram of the AI-driven wireless lubricator remote control system of the present invention operating through a satellite communication network.

Different from the above embodiment, each of the grease injection lubrication devices 110 further comprises a satellite network communication unit 1171. The satellite network communication unit 1171 is connected to the central control processing unit 111. The grease injection lubrication devices 110 are connected to a satellite Internet (such as StarLink or other similar star networks) through the satellite network communication unit 1171 to receive or transmit instructions or information. The satellite Internet is an Internet composed of multiple satellites. Of course, the cloud server host 120 and the mobile device 130 of the present invention can also be connected to a satellite Internet (such as StarLink or other similar star networks). The above-mentioned satellites can be low-orbit satellites or geostationary satellites.

To sum up, the AI-driven wireless lubricator remote control system disclosed in the present invention can bring the following effects:
1. It can effectively improve the shortcomings of conventional grease injectors such as unstable grease output and abnormal early warning.
2. Further check the calibration and compensation grease supply value to ensure a stable and normal supply of grease output.
3. Immediately and synchronously issue a warning and display the installation location and information of the abnormally operating grease injector, so that maintenance personnel can immediately go to deal with it and restore normal grease injection, achieving the purpose of comprehensive protection function of automatic early warning, monitoring grease injection and warning function.
4. Use AI to continuously detect and obtain various data of the application equipment, thereby cyclically training, learning and adjusting to achieve optimal settings.

What is claimed is:
1. An AI-driven wireless lubricator remote control system, comprising:
a plurality of grease injection lubrication devices, each said grease injection lubrication device comprising a central control processing unit, a grease injection lubrication unit connected to said central control processing unit and used to output a lubricant, a parameter setting unit connected to said central control processing unit and used to set grease injection parameters, an operating status information unit connected to said central control processing unit and used to store various operating status information, a detection unit provided with a plurality of sensors with different types of functions and connected to said central control processing unit and used to detect the operating status information and the remaining oil volume information of said grease injection lubrication devices and regularly transmit the operating status information and the remaining oil volume information of said grease injection lubrication devices back to said central control processing unit, a warning unit connected to said central control processing unit, said warning unit having at least one preset warning value and being used to issue a corresponding warning notification if it is determined that any one of said at least one preset warning value is exceeded, a wireless communication unit connected to said central control processing unit, said grease injection lubrication device being connected to a network through said wireless communication unit to receive or transmit instructions or information, and a remaining oil volume information unit connected to said central control processing unit and used to record the remaining oil volume information;
a cloud server host connected to the said wireless communication units of said grease injection lubrication devices through the network, said cloud server host independently calculating a corresponding lubrication maintenance specification based on a bearing specification of an application equipment and application environmental condition information, said parameter setting unit performing a grease injection parameter setting according to said lubrication maintenance specification, wherein different types of application equipment have different lubrication maintenance specifications; and an artificial intelligence (AI) system connected to said cloud server host, said artificial intelligence (AI) system being used to regularly receive various data of the application equipment through said grease injection lubrication devices to adjust the grease injection parameter settings recommended by said lubrication maintenance specification in said cloud server host and continue to detect and obtain various data of said application equipment after setting the new grease injection parameter settings on said grease injection lubrication devices, and use this cycle of training, learning and adjustment to achieve optimal settings, so that the cycle of training, learning and adjustment is used to achieve optimal settings, wherein each said grease injection lubrication device regularly reports the operating status information, the remaining oil volume information and the warning notification to said cloud server host.

2. The AI-driven wireless lubricator remote control system as claimed in claim 1, wherein a mobile device is used to connect to said cloud server host through the network, so that said mobile device is capable of receiving information from said cloud server host through an application (APP) to master the operating status information, the remaining oil volume information and the warning notification of said grease injection lubrication devices.

3. The AI-driven wireless lubricator remote control system as claimed in claim 2, wherein said mobile device is also used to send commands to said cloud server host to further control the operation of each said grease injection lubrication device.

4. The AI-driven wireless lubricator remote control system as claimed in claim 1, wherein based on a deep learning algorithm, said artificial intelligence (AI) system regularly receives the post-lubrication temperature of the application equipment through said grease injection lubrication device, adjusts the grease injection parameter settings recommended by said lubrication maintenance specifications corresponding to the data of temperature, rotation speed and bearing type in said cloud server host according to the temperature after lubrication, and sets the new grease injection parameter settings to said grease injection lubrication devices, and then continuously detects the post-lubrication temperature of the application equipment to cycle training, learning and adjustment.

5. The AI-driven wireless lubricator remote control system as claimed in claim 1, wherein said artificial intelligence (AI) system comprises:

a database unit connected to said cloud server host to update relevant data online, including the data of the application equipment regularly reported by said grease injection lubrication devices and the deep learning algorithm;

a learning and training unit connected to said database unit, said learning and training unit performing learning and training through said deep learning algorithm and based on the relevant data in said database unit;

a condition restriction unit connected to said learning and training unit, said condition restriction unit being used to limit the learning bias of said artificial intelligence (AI) system by setting multiple conditions; and an AI model processing unit connected to said learning and training unit, said AI model processing unit learning and training an AI model through said learning and training unit, said AI model processing unit being the AI brain of said artificial intelligence (AI) system.

6. The AI-driven wireless lubricator remote control system as claimed in claim 1, wherein each said grease injection lubrication device regularly reports the remaining oil volume information to said cloud server host, and said cloud server host calculates an oil exhaustion date for each said grease injection lubrication device based on the remaining oil volume information and a grease injection frequency setting value.

7. The AI-driven wireless lubricator remote control system as claimed in claim 6, wherein said cloud server host sends a consumable replacement notification reminder in advance and at least once based on said oil exhaustion date.

8. The AI-driven wireless lubricator remote control system as claimed in claim 1, wherein when said detection unit detects a system connection failure, grease injection abnormality, mechanical failure or abnormal event that stops operation, said warning unit immediately issues a warning notification corresponding to the abnormal event.

9. The AI-driven wireless lubricator remote control system as claimed in claim 1, wherein each said grease injection lubrication device further comprises a satellite network communication unit connected to said central control processing unit, and each said grease injection lubrication device is connected to a satellite Internet composed of multiple satellites through the satellite network communication unit thereof to receive or transmit instructions or information.

10. The AI-driven wireless lubricator remote control system as claimed in claim 1, wherein said network is selectively the Internet or a private network.

* * * * *